United States Patent [19]

Park

[11] Patent Number: 5,015,868
[45] Date of Patent: May 14, 1991

[54] REAL TIME DISTANCE SENSOR

[75] Inventor: Hong C. Park, Seoul, Rep. of Korea

[73] Assignee: Goldstar Co., Ltd., Seoul, Rep. of Korea

[21] Appl. No.: 277,268

[22] Filed: Nov. 29, 1988

[30] Foreign Application Priority Data

Nov. 30, 1987 [KR] Rep. of Korea .......... 13680/1987[U]

[51] Int. Cl.$^5$ ............................................ G01N 21/86
[52] U.S. Cl. ..................................... 250/561; 356/1; 356/4
[58] Field of Search ....................... 250/201, 204, 561; 356/1, 4

[56] References Cited

U.S. PATENT DOCUMENTS 4,668,084 5/1987 Suzuki et al. ......................... 356/1
4,760,419 7/1988 Fujiwara et al. ...................... 356/1

Primary Examiner—David C. Nelms
Assistant Examiner—Khaled Shami

[57] ABSTRACT

A real time distance sensor for measuring distance by calculating the position of image of reflected laser beams with an extremely high-speed, includes a detection module containing a light receiving lens, an infrared ray filter, a CCD sensor, a lens system, and a laser; and a processing module containing a comparator, a differentiator, a pulse shaping circuit, a T flip-flop, a counter, a latch circuit, a ROM for calculation of distance, and power control and a D/A converter wherein the lens system contains cylindrical form for maintaining the intensity of laser beams with the travel of the beams.

8 Claims, 4 Drawing Sheets $S \propto r\delta$ $(\therefore H-h \propto T)$

REAL TIME DISTANCE SENSOR

BACKGROUND OF THE INVENTION

1. Field of the Invention

The present invention relates to a real time distance sensor and particularly, to a distance-measuring device which measures the distance by calculating the position of an objecting using reflected laser beams to meet the need for high-speed measurements.

1. 2. Description of the Prior Art

In the prior art, to achieve extremely high-speed measurements, ultrasonic waves are projected at an object and returned as echoes bouncing off the target. The distance is calculated from the time of the round-trip of the waves and with respect to the travel speed of ultrasonic wave. However, the prior art method has a disadvantage in the measuring of time.

SUMMARY OF THE INVENTION

Accordingly, it is an object of the present invention to provide an improved real time distance sensor.

Another object of the present invention is to provide a distance-measuring system which measures the distance by calculating the position of image generated by reflected laser beams for the need of high-speed measurements.

Other objects and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, a real time distance sensor for measuring distance by calculating the position of image generated by reflected laser beams with an extremely high-speed, includes a detection module containing a light receiving lens, an infrared ray filter, a CCD sensor, a lens system, and a laser; and a processing module containing a comparator, a differentiator, a pulse shaping circuit, a T flip-flop, a counter, latch circuit, a ROM for calculation of distance and power control, and a D/A converter. The lens system contains cylindrical form lenses for maintaining the intensity of laser beams along the travel path of the beams.

BRIEF DESCRIPTION OF THE DRAWINGS

The present invention will become more fully understood from the detailed description given below and the accompanying drawings which are given by way of illustration only, and thus are not limitative of the present invention, and wherein.

DESCRIPTION OF THE PREFERRED EMBODIMENTS

Figure 1:
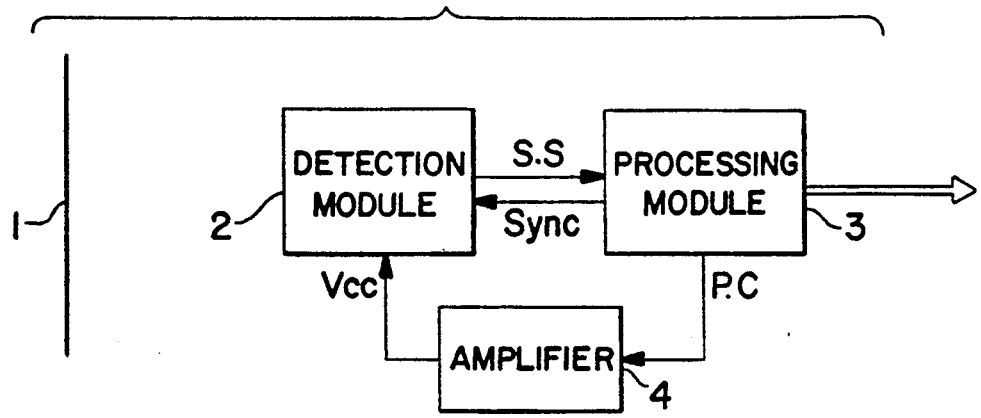
FIG. 1 shows a block diagram of the whole system of the present invention.

Referring now in detail to the drawings for the purpose of illustrating preferred embodiments of the present invention, the apparatus as shown in FIG. 1 comprises a detection module 2 provided with a processing module 3 for receiving scanned signals produced from the laser beam reflected from an object 1 and sends synchronous signals, and with an amplifier 4 for controlling power and applies a predetermined voltage Vcc to the detection module 2.

Figure 2:
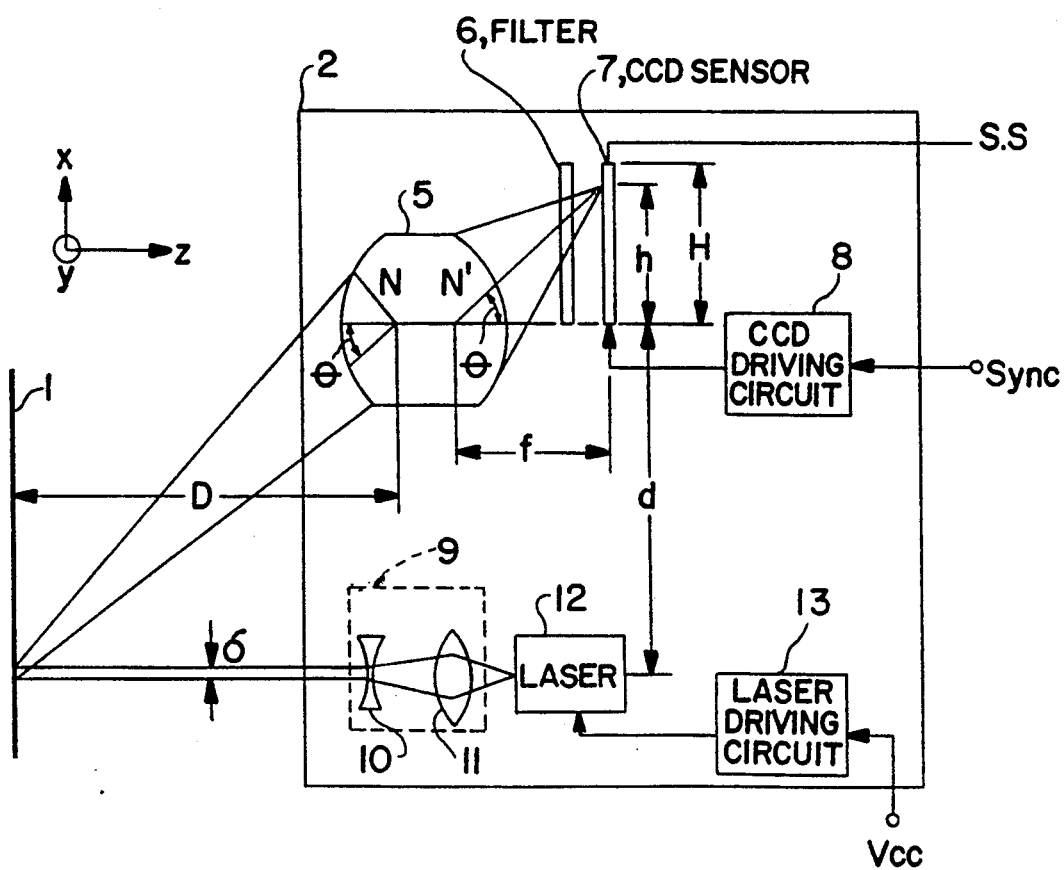
FIG. 2 shows a detection module according to the present invention.
Figure 3A:
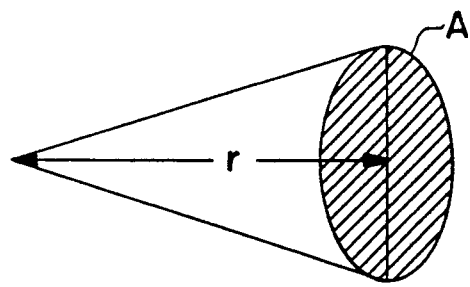
FIG. 3(a) shows a spherical waveform of laser beams according to the present invention.
Figure 3B:
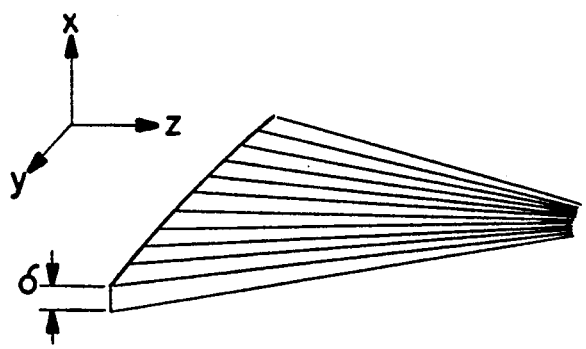
FIG. 3(b) shows a fan ribform of spreading of laser beams according to the present invention.

Referring to FIG. 2 of the detection module 2 includes a laser driving circuit 13 driven by the source Vcc applied from the amplifier 4 which in turn, drives a laser 12 to radiate laser beams, that spread out in the form of fan ribs as shown in FIG. 3(b), through a lens system 9 consisting of lenses 10 and 11. Since laser beams lose their intensity proportional to the path the laser beam travels, the loss of intensity is compensated by providing the lens of the beam emitter in the form of a cylinder lens to emit beams in the form of thin fan ribs.

The beams projected in the fan shape mostly reflect off the object 1 according to the face features of its surface, but some of the beams are diffused upon reflection and are received by receiving a lens 5 (that is also known as $f\theta$ lens). The received image passes through an infrared ray filter 6 to image upon a CCD (charge coupled device) detector 7. The relationship between the receiving lens 5 and lens system 9 with respect to object 1 is expressed by the formula, $$h = f(f, d, D) \tag{1}$$

wherein h is the height of the image, f is the focus distance of receiving lens 5, d is the distance between optical axes of the lens 5 and system 9, and D is the distance between object 1 and the lens 5. More specifically, h=F and $$\theta = \tan^{-1}\frac{d}{D} \approx \frac{d}{D} \quad (\because D >> d)$$

establish the formula, $$h = f \times \frac{d}{D} \text{ or } D = \frac{df}{h} \tag{2}$$

wherein the formula, the distance D between the object 1 and detection module 2 may be obtained by processing signals from the CCD detector 7 and finding the position h of the image.

The CCD sensor 7 includes a photosensitive line array 14 and a line CCD 15, which is driven by a line CCD driving circuit 8. Scanned signals S.S from the line CCD 15 are processed by the processing module 3, and the line CCD driving circuit 8 is driven in response to synchronous signals Sync applied from the module 3. The main function of the processing module 3 is to measure the time distance between a first peak signal and a synchronous signal which are detected from the S.S. signal since the time distance is proportional to the value obtained by deducting the height h of the image from the whole size H of the CCD sensor 7.

Figure 5:
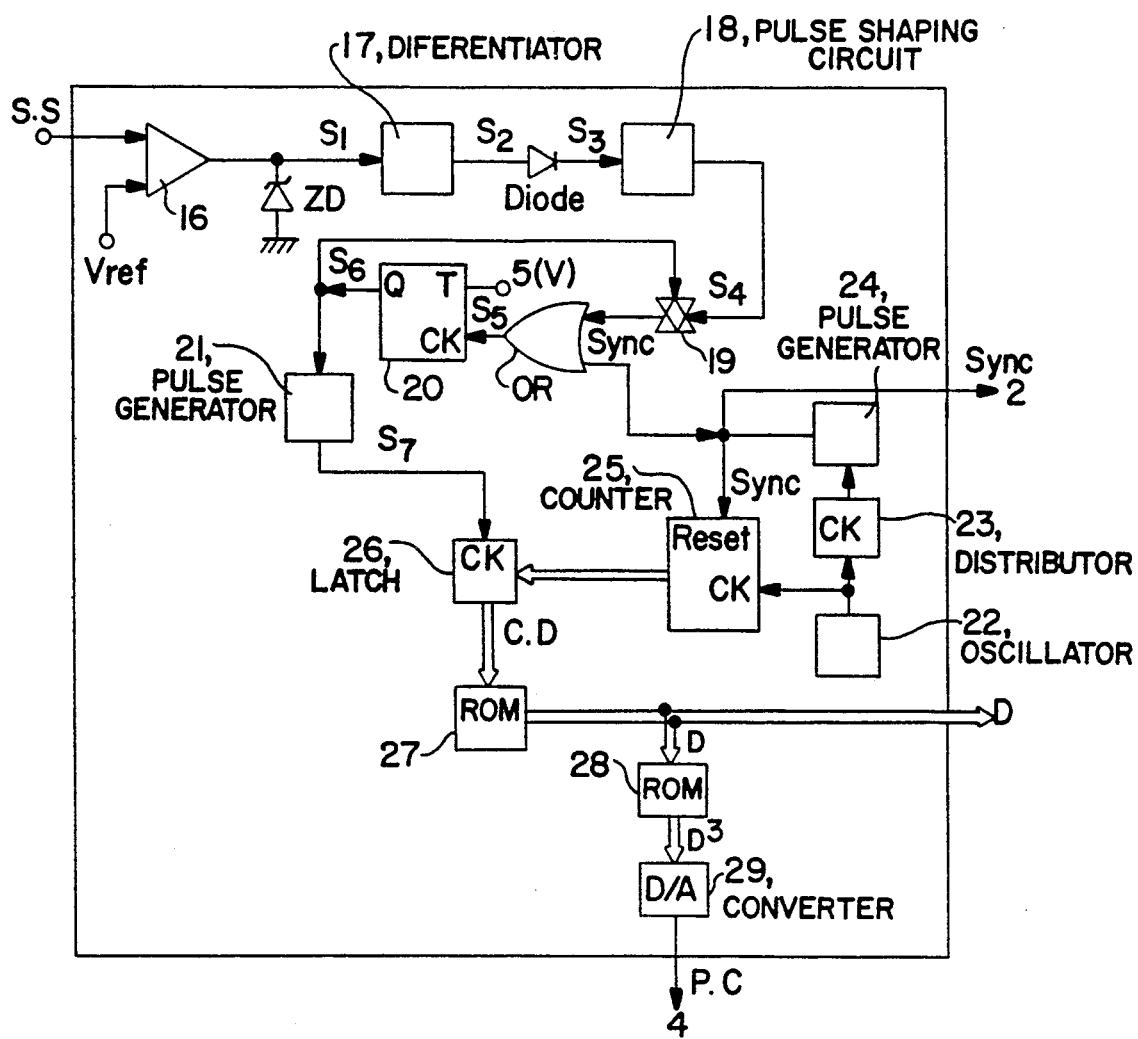
FIG. 5 shows a block diagram of a processing module according to the present invention.

As shown in FIG. 5, the processing module 3 includes a comparator 16 which is connected to a pulse shaping circuit 18 through a grounded Zener diode ZD, a differentiator 17, and a diode D1 and further connects with a terminal of an OR gate through a transmission gate 19. The other terminal of the OR gate is connected to a pulse generator 24. The output of the OR gate is connected to the clock of a T flip-flop 20 of which a T terminal is applied with 5V. The output of the flip-flop is connected to the transmission gate 19 and a pulse generator 21, which are connected with a distance-finding ROM 27 through a latch circuit 26, that on one hand, outputs the obtained distance as D value and on the other hand, connects with amplifier 4 to control the power through a power control ROM 28 and a D/A converter 29. The latch circuit 26 is also connected to a counter 25 which receives through its clock pulses that are also applied to the clock section of a distributor 23, which applies synchronous signals to the reset section of the counter 25, a section of the OR gate, and the detection module 2 through a pulse generator 24.

In operation of processing module 3, a comparator 16 compares the S.S with a reference voltage Vref and gives a rectangular wave signal output with a greater voltage than Vref by the function of the Zener diode. The rectangular wave is then differentiated at the differentiator 17 so that only positive pulses pass through the diode and properly changes into pulses through the pulse shaping circuit 18 for the next digital system. The pulse signal S4 from the circuit 18 is applied via the transmission gate 19 to the OR gate to which is also applied a periodic synchronous signal generated by an oscillator 22, a distributor 23, and a pulse generator 24. The output from an OR gate is applied to the clock section of the T flip-flop 20, of which output Q controls the on/off state of the transmission gate 19 in such a way that a high pulse in the synchronous signal Sync causes the OR gate to output a high pulse S5 to be applied to the clock section of T flip-flop 20, of which the output Q then becomes a "high" signal S6 and turns on the transmission gate 19 to allow the input of signal S4. However, as shown at T1, after To, in FIG. 6, upon applying signal S4 via the transmission gate 19 and the OR gate to the clock terminal of T flip-flop 20, the output Q becomes a "low" signal S6 and turns off the gate 19.

The output Q of the T flip-flop 20 remains "low" even with the generation of pulse signal S4 from the pulse shaping circuit 18 and it only becomes "high" when synchronous signal is again generated from the pulse generator 24. This output is inputted to the pulse generator 21, which produces pulses at the falling edge of the output signal from the flip-flop, thus it produces a pulse at the moment T1 of applying the first peak. Therefore, the pulse produced is a signal that latches the data of the counter 25 reset by synchronous signal, such that it latches numbers in proportion to T1-T0, the values being proportional to H-h.

As shown in FIG. 2, the scanned signals S.S are serial outputs of the data of the upper section from the CCD sensor 7, and the CCD driving circuit 8 is driven upon the receiving synchronous signal Sync from the pulse generator 24 as shown in FIG. 5, so that it operates according to the physical height h of the CCD sensor 7.

Figure 6:
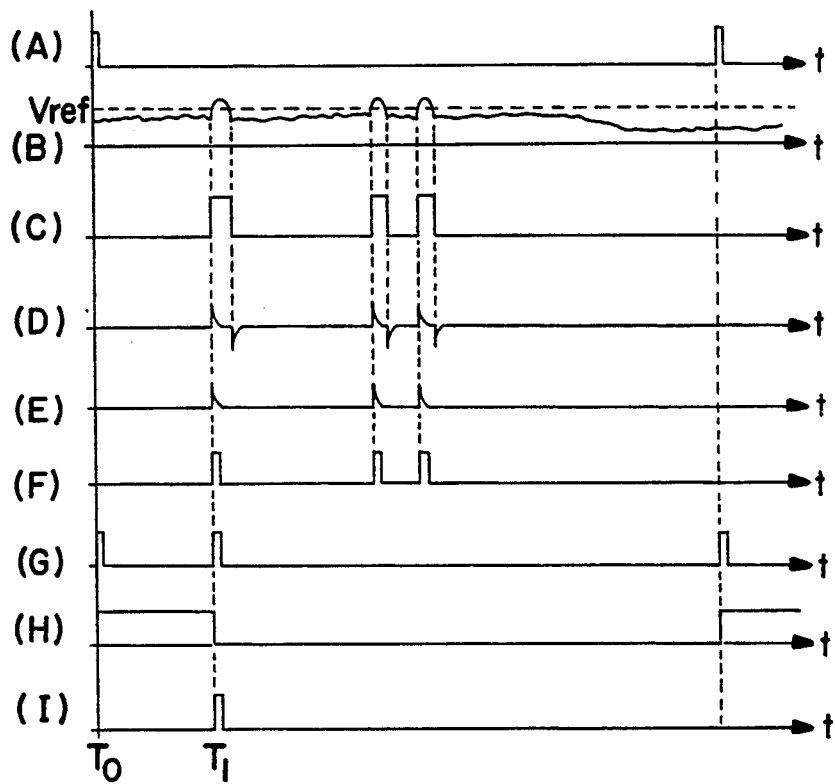
FIG. 6 shows signal wave forms at the sections of the processing module according to the present invention.
Figure 7A:
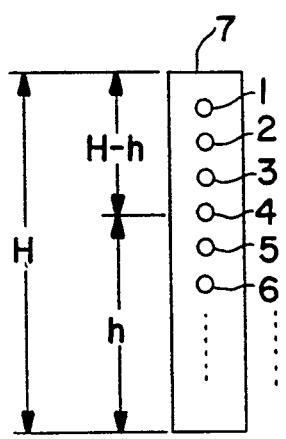
FIG. 7 shows the relationship between the CCD sensor and S.S signals according to the present invention.
Figure 7B:
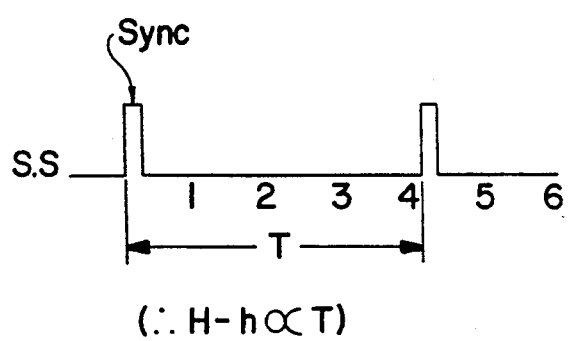

As shown in FIG. 7, signals S.S generate signals ($\beta$) as shown in FIG. 6 in proportion to time distance T between pulses synchronous signal Sync, and applies signal S4 to the transmission gate 19 via the differentiator 17, a diode, and the pulse shaping circuit 18. Also, synchronous signal Sync from the pulse generator 24 as shown in FIG. 5, is applied to the reset terminal of the counter 25. Therefore, the value ($\propto$ T) from the generation of synchronous signal through the application of output signal S7 of the pulse generator 21 to the latch circuit 26 is stored at the latch 26 to be given as output (C.D), which is C.D $\propto$ (T1-T0), (H-h) $\propto$ T.

Figure 3C:
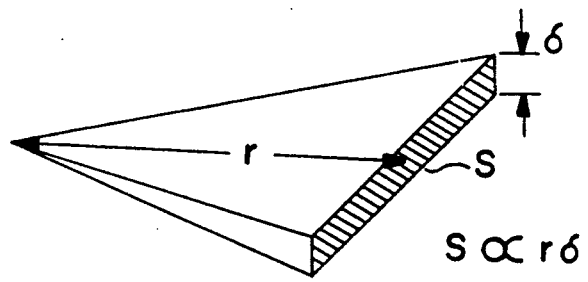
FIG. 3(c) shows a fan shaped spreading of laser beams according to the present invention.
Figure 4:
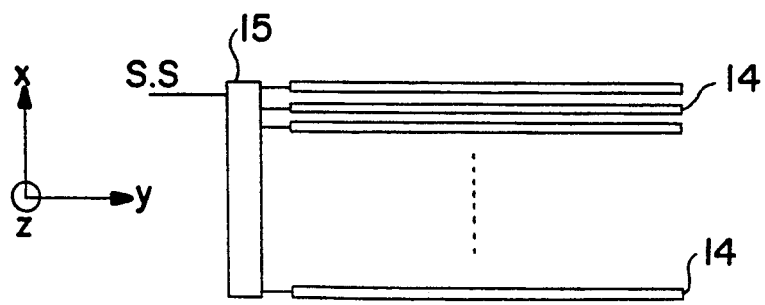
FIG. 4 shows a form in an image scanner of a CCD sensor according to the present invention.

As shown in FIG. 2, the determination of f and d in formula (2) can obtain D which is stored in the distance-calculating ROM 27. Accordingly, the increase in D increases the intensity of laser beams, and as shown in FIG. 3(a), when the beam radiates in spherical waves, the amount of beams received by the object 1 distributes over an area A in proportion to $r^2$. At this time, the beam energy received per unit area is in proportion to $\frac{1}{r}$. However, when the beams project in the shape of fan ribs, as shown in FIG. 3(b), the radiated area S is proportional to r as shown in FIG. 3(c). The radiation energy per unit area is proportional to 1/r to increase the beam energy received by the object. The diffused reflection of the laser beams in the fan shape off the object 1 causes the incident ray upon the receiving-lens 5 (also known as f$\theta$ lens) to radiate as a spherical wave and reach the lens 5 at an intensity of ray proportional to $\frac{1}{r}$. Therefore, the amount of light energy reaching the lens 5 is proportional to $\frac{1}{r}$ of the amount of light energy projected from the laser 12, so that the amount of light energy received by the lens 5 is in proportion to $$\frac{1}{D} \times \frac{1}{D^2} = \frac{1}{D^3}$$

(D is distance r). The brightness of image that is the intensity of scanned signal S.S is in proportion to $\frac{1}{r}$. Therefore, to maintain the magnitude of signals at a constant level, power is controlled in accordance with D. That is, D is utilized by the power control ROM 28 to determine the output the digital value of $D^3$, which is applied to D/A converter 29 to be converted into an analog signal. The analog signal is then amplified by the amplifier 4 to control the power of laser 12 in proportion to $D^3$ through the driving circuit 13.

Wave forms for the operation described above are shown in FIG. 6: (A) shows the synchronous signal; (B) shows scanned signal S,S; (C) shows S1 signal; (D) shows S2 signal from differentiator 17; (E) shows S3 signal after passing the diode; (F) shows S4 signal from pulse shaping circuit 18; (G) shows S5 signal from OR gate; (H) shows S6 signal output from T flip-flop; and (I) shows S7 signal from pulse generator 21.

According to the present invention, the real time sensor measures in extremely short time the distance of an object by driving the CCD sensor 7 with high frequency.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A real time distance sensor, comprising:
   laser means for producing a laser beam to be reflected off an object;
   lens means for directing said laser beam onto said object;
   CCD sensor means for detecting the reflected laser beam and for generating scanned signals according to a position of an image formed by the reflected laser beam;
   pulse shaping means, operatively connected to said CCD sensor means, for producing digital pulse signals when said scanned signals are above a predetermined threshold level;
   synchronous signals generating means for generating synchronous signals;
   flip-flop means, operatively connected to said pulse shaping means and said synchronous signals generating means, for comparing said digital pulse signals with said synchronous signals and for generating a pulse signal representing the comparison;
   counter means for producing count data representing a measuring of a time interval between pulses in said synchronous signals;
   latch means, responsive to said pulse signal, for latching said count data; and
   calculating means, responsive to the latched count, for calculating a distance of said object from the real time distance sensor.

2. The real time distance sensor as claimed in claim 1, wherein said lens means interacts with said laser beam to produce a laser beam having individual rays which form a fan shape, said individual rays forming ribs of said fan shape.

3. The real time distance sensor as claimed in claim 1, wherein said CCD sensor means comprises:
   a receiving lens having an infra-red filter to receive the reflected laser beam, the reflected laser beam having a power level proportional to said distance cubed.

4. The real time distance sensor as claimed in claim 1, further comprising:
   driving means, operatively connected to said laser means, for driving said laser beam at a certain power level in accordance with the calculated distance.

5. The real time distance sensor as claimed in claim 1, wherein said calculating means is a ROM.

6. The real time distance sensor as claimed in claim 1, wherein said pulse shaping means comprises:
   comparing means for comparing said scanned signal to said predetermined threshold level and for producing a comparison signal;
   differentiating means, operatively connected to said comparing means, for differentiating said comparison signal to produce a differentiated signal;
   diode means, operatively connected to said differentiating means, for blocking negative pulses in said differentiated signal; and
   means, operatively connected to said diode means, for converting a signal from said diode means into said digital pulse signal.

7. The real time distance sensor as claimed in claim 1, further comprising:
   gate means, operatively connected to said pulse shaping means and said flip-flop means, for selectively transmitting said digital pulse signal to said flip-flop means in accordance with said pulse signal.

8. The real time distance sensor as claimed in claim 1, wherein said synchronous signals generating means comprises:
   oscillating means for generating a signal having a predetermined frequency; and
   pulse generating means, operatively connected to said oscillating means, for generating said synchronous signals in accordance to said signal;
   said counter means utilizing said frequency of said signal to produce said count data.

* * * * *